United States Patent [19]

Zeman

[11] 3,860,268
[45] Jan. 14, 1975

[54] TUBE LOCKING STRUCTURE
[76] Inventor: David G. Zeman, 10030 Greenleaf Ave., P.O. Box 3021, Santa Fe Springs, Calif. 90607
[22] Filed: Jan. 2, 1973
[21] Appl. No.: 320,107

[52] U.S. Cl. ................... 285/14, 285/242, 285/255, 285/423
[51] Int. Cl. .......................... F16l 55/00, F16l 33/08
[58] Field of Search .......... 285/242, 255, 256, 259, 285/13, 14, 423

[56] References Cited
UNITED STATES PATENTS

| | | | |
|---|---|---|---|
| 2,787,480 | 4/1957 | Staller | 285/259 |
| 3,210,100 | 10/1965 | Lowles et al. | 285/259 X |
| 3,257,132 | 6/1966 | Lyons | 285/259 X |
| 3,290,067 | 12/1966 | Buckle | 285/259 X |
| 3,359,013 | 12/1967 | Knox et al. | 285/13 |
| 3,604,728 | 9/1971 | Symcha et al. | 285/14 |
| 3,741,238 | 6/1973 | Lacey | 285/255 X |

*Primary Examiner*—H. Hampton Hunter
*Attorney, Agent, or Firm*—Edward D. O'Brian

[57] ABSTRACT

A comparatively thin, thermoplastic tube used for agricultural watering purposes can be effectively secured in place at the end of a nipple by forming the nipple with a tapered exterior which decreases in diameter away from the end, by locating the tube over the end and by securing the tube in place with a specially formed locking ring. The ring is generally cylindrical in shape and has a tapered interior; preferably this interior carries a plurality of barbs. The ring is used with its interior generally parallel to the exterior of the nipple and with the tube is held under compression between the interior of the ring and the exterior of the nipple.

2 Claims, 4 Drawing Figures

PATENTED JAN 14 1975　　　　　　　　　　　3,860,268
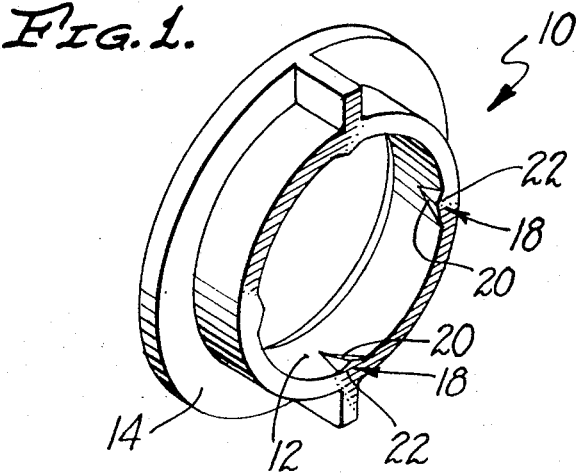
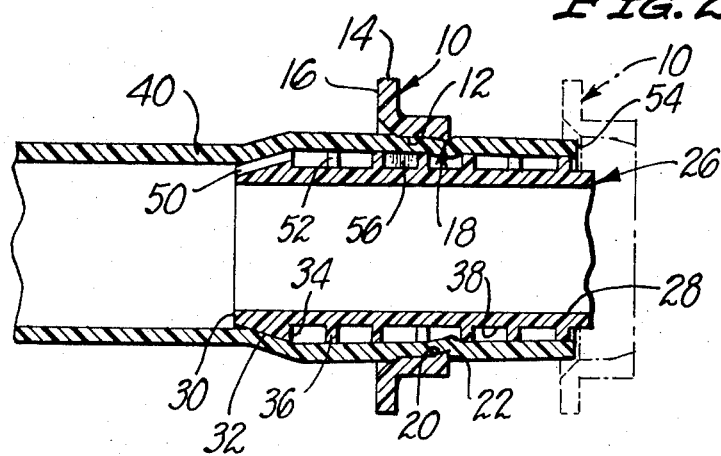
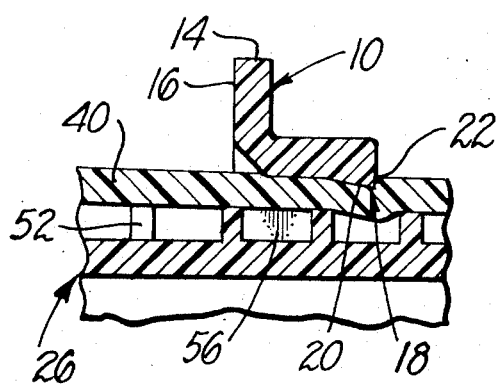
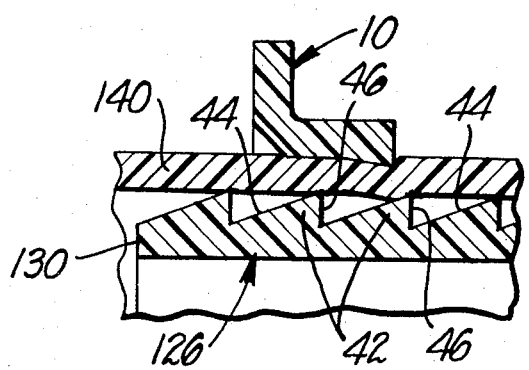

TUBE LOCKING STRUCTURE

BACKGROUND OF THE INVENTION

The invention set forth in this specification pertains to locking structures and more specifically to tube locking structures which are employed in securing comparatively thin, flexible thermoplastic tubes to appropriate fittings having extending nipples in various agricultural applications. In such applications the tubes used are employed to convey water to appropriate dripper type devices, sprinklers and the like. In these applications the tubes and various fittings connecting them are exposed to ambient conditions.

Frequently such tubes are heated to a signigicant extent by these conditions. Because of their inherent characteristics they become comparatively soft and flexible and they tend to change dimension rather easily as pressure is applied to them. These factors effectively preclude the use of conventional push-on type nipples, some clamping rings and the like in connection with tubes as indicated used for agricultural watering purposes. This is becuase as such tubes become heated up and as pressure is applied to their interiors as a result of the pressure of water flow they tend to pop off of or come off of fittngs to which they have been connected in a conventional manner.

It is acknowledged that certain types of prior structures for holding tubes on fittings can be utilized in various agricultural applications of tubes. It is considered however that the utilization of such prior structures for such purposes is disadvantageous because of economic considerations. The importance of this will be realized by considering that tremendous quantities of tubes and fittings are utilized for agricultrual purposes in watering a large farm or ranch area. An agricultural user has to weigh the cost of a watering system against the benefits to be achieved from such a system in deciding whether or not to use such a system. The lower the cost of an agricultural watering system, the greater the chances of it being adopted and used.

From this it is believed that it will be apparent that there is a need for new and improved tube locking structures, and more specifically a need for such structures in the agricultural or irrigation field. More specifically there is a need for inexpensive locking structures which may be easily and conveniently manufactured at a very low cost, which may be easily and conveniently installed, and which are extremely effective for their intended purpose.

SUMMARY OF THE INVENTION

A broad objective of the present invention is to provide new and improved tube locking structures. The invention is intended to provide locking structures which may be easily and conveniently manufactured at a very low cost. It is also intended to provide such structures which may be easily and conveniently installed and used with a minimum of difficulty at a lower cost than prior related structures. The invention is also intended to provide locking structures as indicated which effectively secure tubes as indicated in place even when such tubes are subjected to extreme ambient conditions.

In accordance with this invention these and various related objectives are achieved through the use of a rigid generally cylindrical ring having a tapered interior in holding a tube under compression around a tapered exterior of a nipple so that the tube is under compression between the ring and the nipple. Preferably the tapered exterior of the nipple decreases in diameter away from the end of a nipple and preferably the ring is dimensioned so as to be capable of fitting over the end of the nipple when the tube is not in place on the nipple and so as to be incapable of being moved off of the nipple when the tube is located over the end of the nipple so as to extend around the tapered exterior of the nipple.

BRIEF DESCRIPTION OF THE DRAWING

A summary of this type is inherently incapable of effectively indicating many details which are significant relative to the invention such as the invention set forth in this specification. This invention is best more fully described with reference to the accompanying drawing in which:

FIG. 1 is an isometric view of a presently preferred embodiment or form of a locking ring in accordance with this invention;

FIG. 2 is a cross-sectional view showing this ring in place upon a presently preferred embodiment or form of a nipple and holding a tube upon this nipple;

FIG. 3 is an enlarged fragmentary view corresponding to FIG. 2 illustrating how the locking ring used engages and deforms a tube so as to achieve an effective holding action; and FIG. 4 is a view similar to FIG. 3 of a modified nipple being capable of being used with a locking ring as previously described.

DETAILED DESCRIPTION OF THE PREFERRED EMBODIMENT

In the drawing there is shown a locking ring 10 in accordance with this invention which is preferably formed to have a generally cylindrical shape out of a comparatively rigid thermoplastic polymer material which will not significantly change shape or soften under normal ambient conditions and which will also not become brittle and hard so as to break under such conditions. It is considered that such conditions require that the ring 10 be "stable" under a wide range of temperatures of from about 0°F. to about 130°F.

It will be realized that in some areas an agricultural watering system will not be subjected to these temperature extremes while in other areas on occasion an agricultrual watering system will be subjected to less temperature variation than indicated. Since a number of polymers are capable of being dimensionally stable within the temperature range indicated, no effort is made herein to enumerate various polymers which may be used in forming the ring 10. In general the cheapest rigid polymer or comparatively rigid polymer which is dimensionally stable over the temperature range at which a ring 10 is to be used should be employed.

The shape of this ring 10 is however significant. Preferably this ring has a tapered interior 12 and an extended, external rim-like flange 14 extending completely around at the end 16 of the ring 10 where the interior 12 is the largest. Preferably the ring 10 is provided with a plurality of equally spaced barbs 18, each of which has a sloping surface 20 and a face 22 extending substantially transverse to the axis of the ring 10. It will be seen that these faces 22 face the end 24 of the ring 10 where the interior 12 is the smallest dimension or diameter. The sloping surfaces 20 thus gradually lead towards the center of the ring 10 as they extend away from the end 16 where the diameter of the interior 12 is the greatest.

The ring 10 may be used with the nipple 26 as indicated in FIG. 2 of the drawing. This nipple 26 may be formed as an extremity upon any types of a fitting used in a watering system or may even itself be used as an extremity of a known type of dripper structure in which the nipple itself serves as a restricted flow passage in dispensing water. This nipple 26 should be formed of a material such as is used with the ring 10. It is thought that on a rare occasion it may be desirable to form the nipple 26 out of a conventional metal.

As formed the nipple 26 has an internal flow passage 28 leading from an end 30. This end 30 carries an outwardly flaring conical surface 32 which increases in dimension away from the physical end 30. This surface 32 terminates in a ring-like wall 34 extending transverse to the axis of the flow passage 28. This surface 32 may be considered as a part of the end 30 because of the manner in which the nipple 26 is used as herein described.

The nipple 26 also includes a plurality of spaced, parallel holding flanges 36 which are located in planes transverse to the axis of the passage 28 so as to extend from the cylindrical exterior 38 of the nipple 26. These flanges 36 are preferably all of a lesser diameter than the largest diameter of the surface 32 and preferably decrease in diameter away from the surface 32 and the end 30. As the nipple 26 is used as hereinafter indicated the outer edges (not separately numbered) of these flanges 36 constitute a tapered exterior of the nipple 26.

The ring 10 and the nipple 26 are intended to be utilized with a comparatively thin, flexible, somewhat elastic thermoplastic tube 40. This tube 40 will normally be formed as thin as reasonably possible because of economic considerations. It will be normally flexible so that it can be conveniently coiled up as it is shipped and so that it may be conveniently located in an agricultrual field. It is considered that usually the tube 40 will be a polyethylene tube although it is possible to utilize tubes formed of other polymers.

As formed this tube 40 will have a diameter such that its diameter is slightly greater than the smallest diameter of the surface 32 and is less than the greatest diameter of the surface 32. This permits the tube 40 to be easily and conveniently pushed against the surface 32 so that it will extend along the length of the nipple 26 as illustrated. As the tube 40 is located in this manner it will stretch to some limited extent and its inherent resiliency will cause it to abut up against the outer edges of the holding flanges 36.

In assembling a tube 40 as described preferably the ring 10 will be located around the nipple 26 before the tube 40 is so assembled upon this nipple 26 in a position as shown by phantom lines in FIG. 2. For the ring 10 to be capable of being so assembled the smallest internal dimension of the interior 12 and the barbs 18 must be greater than the greatest diameter of the surface 32. When the ring 10 has been located as shown by phantom lines as indicated in FIG. 2 and when the tube 40 has been located as shown in this FIG. the flange 14 may be conveniently engaged by hand or a tool so as to jamb the ring 10 into a position in which the interior 12 extends parallel to the exterior of the nipple 26 as defined by the edges of the holding flanges 36. As the ring 10 is moved in this manner the barb 18 will tend to slide along and bite into the exterior of the tube 40 so as to hold the ring 10 against being backed off of the tube 40.

As the ring 10 is forced into place as described both the interior 12 and the barbs 18 will engage the tube 40 so as to tend to compress and deform the tube 40 so that it bows inwardly in the spaces between the holding flanges 36. This is considered to be quite important in achieving an effective locking action. In order for the ring 10 to function properly as described the dimensions of the interior 12 must be sufficiently small so that this ring 10 is incapable of passing over the surface 32 as the ring 10 is assembled as shown.

It will be realized that the type of locking action achieved is not dependant upon the precise shape of the holding flanges 36, although the shapes of these flanges is considered preferable because of the effectiveness of the holding action achieved with them and because of economic considerations. This is considered to be illustrated in FIG. 4 of the drawing. Since this FIG. 4 is closely related to the preceding FIG. 3 all parts indicated in it are designated by the numerals previously used to describe such parts preceded by the numeral 1 and various parts illustrated in FIG. 4 which are the same or substantially the same as parts indicated in the preceding description are not separately identified herein.

In FIG. 4 the flanges 36 previously described are replaced by tapered ridges 42 located in planes transverse to the axis of the nipple 126. Each of these ridges has a sloping surface 44 gradually increasing in diameter away from the end 130 which terminates in a wall 46 extending transverse to the axis of the flow passage 128. These ridges 42 gradually decrease in diameter away from the end 130 so as to be capable of being used in a manner as previously described in holding a tube 140 firmly in place.

This holding or locking action achieved with the invention can on occasion be effectively utilized in dripping or dispensing water. As an illustration of this the surface 32 may be provided with a small slot 50 which can convey water from the flow passage 28 and the interior of the tube 40 to the space between the wall 34 and the adjacent flange 36. In order to achieve effective water dispensing it is preferred that the end 54 of the tube 40 be only inserted over the nipple 26 a limited amount so that it does not directly contact the cylindrical exterior 38. These flanges 36 should be formed with offset or staggered notches 52 so that the water conveyed through the slot 50 will travel a tortuous path in escaping from this interior of the nipple 26 to the exterior of this nipple 26.

Similar slots and notches may be used with the structure shown in FIG. 4. In using a structure as herein described as a dripper it is even possible to replace the flanges 36 with a known type of single spiraled flange extending around the exterior 38 as it decreases in diameter away from the end 30. If desired the flanges 36 when used as a dripper may be interconnected at various locations by cross-walls 56 so as to cause the water to flow in a back and forth tortuous path.

The structures indicated is considered to be very effective for its intended purposes. As pressure is applied to tube 40 in such a way so as to tend to pull the tube 40 off of the nipple 26 the barbs 18 will hold with respect to the tube 40 so that the net effect of such pressure will be to increase the compression of the tube 40 around the nipple 26. This in turn will only result in the tube 40 being more firmly secured in place. This type of action is considered particularly important and signigicant when the invention is used in watering applications in locations where there are high ambient temperatures which will tend to soften the tube 40 so that such a tube 40 will tend to deform and flow to some degree as pressure is applied to it.

I claim:

1. In a structure in which a flexible, thermoplastic tube is held upon the exterior of a nipple the improvement which comprises:

said nipple having an end over which said tube is capable of being located so that said tube extends along the exterior of said nipple and a tapered exterior which decreases in diameter away from said end, a rigid, generally cylindrical ring having a tapered interior located around said tube and the exterior of said nipple, barb means located on the interior of said ring so as to extend from the interior of said ring towards the center of said ring, said barb means having holding faces extending transverse to the axis of said nipple on the extremeties thereof remote from said end of said nipple, said exterior of said nipple being defined by a plurality of holding flanges extending around and outwardly from said nipple and being spaced from one another, said flanges gradually decreasing in diameter away from said end of said nipple, said ring holding said tube under compression between the interior of said ring and the edges of said flanges, said barb means engaging said tube so as to deform said tube generally towards the space between and adjacent to said flanges, the interior of said ring extending generally parallel to the exterior of said nipple.

2. A structure as claimed in claim 1 including:

opening means leading between said tube and said nipple and formed in said flanges defining a restricted flow passage from the interior of said tube and said nipple to the exterior of said nipple for use in dispensing water from the interior of said tube and said nipple.

* * * * *